United States Patent
Viola et al.

(10) Patent No.: US 6,858,683 B2
(45) Date of Patent: Feb. 22, 2005

(54) PROCESS FOR THE PREPARATION OF SBR RUBBERS WITH AN IMPROVED PROCESSABILITY AND A LOWER ROLLING RESISTANCE

(75) Inventors: Gian Tommaso Viola, Cervia-Ravenna (IT); Luca Soddu, San Pietro Terme Bologna (IT); Sabrina Isidori, Ravenna (IT); Attilio Taccioli, Milanese-Milan (IT); Francesco Masi, Lodigiano-Lodi (IT)

(73) Assignee: Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 10/257,395

(22) PCT Filed: Apr. 5, 2001

(86) PCT No.: PCT/EP01/07030

§ 371 (c)(1),
(2), (4) Date: Jun. 2, 2003

(87) PCT Pub. No.: WO01/81430

PCT Pub. Date: Nov. 1, 2001

(65) Prior Publication Data

US 2004/0006187 A1 Jan. 8, 2004

(30) Foreign Application Priority Data

Apr. 20, 2000 (IT) ..................................... MI2000A0887

(51) Int. Cl.[7] ............................. C08F 2/04; C08C 19/00
(52) U.S. Cl. ..................... 526/86; 526/182; 525/333.3; 525/359.5
(58) Field of Search ........................... 526/86, 56, 182; 525/333.3, 359.5

(56) References Cited

U.S. PATENT DOCUMENTS

| 3,639,367 A | | 2/1972 | Halasa |
| 3,755,276 A | * | 8/1973 | Oldack et al. ............... 525/244 |
| 5,914,378 A | | 6/1999 | Viola et al. |

FOREIGN PATENT DOCUMENTS

FR 2 003 187 11/1969

OTHER PUBLICATIONS

Basic Principles of Organic Chemistry, Roberts and Caserio, W.A. Benjamin, Inc., N.Y., pp. 63–66, 1964.*
U.S. Appl. No. 09/431,223, filed Nov. 1, 1999, Viola et al.
U.S. Appl. No. 10/257,395, filed Oct. 18, 2002, Viola et al.

* cited by examiner

*Primary Examiner*—Fred Teskin
(74) *Attorney, Agent, or Firm*—Oblon, Spivak, McClelland, Maier & Neustadt, P.C.

(57) ABSTRACT

Process for the production of statistic elastomeric conjugated diene-vinyl arene copolymers having a branched structure which comprises: (1) anionic copolymerization in solution of the conjugated diene and vinyl arene monomers, in the presence of randomizing agents and an initiator selected from the group of Lithium alkyls, the copolymerization being carried out until the almost total disappearance of the monomers; (2) addition to the solution of step (1) of a quantity of Lithium alkyl from 1 to 4 times the molar quantity of the Lithium alkyl of step (1); (3) addition to the polymeric solution of step (2) of a compound having the general formula R—Br, the molar ratio between R—Br and the total Lithium alkyl ranging from 0.6/1 to 1/1, preferably from 0.7/1 to 0.9/1, thus obtaining an elastomeric branched copolymer.

18 Claims, 1 Drawing Sheet

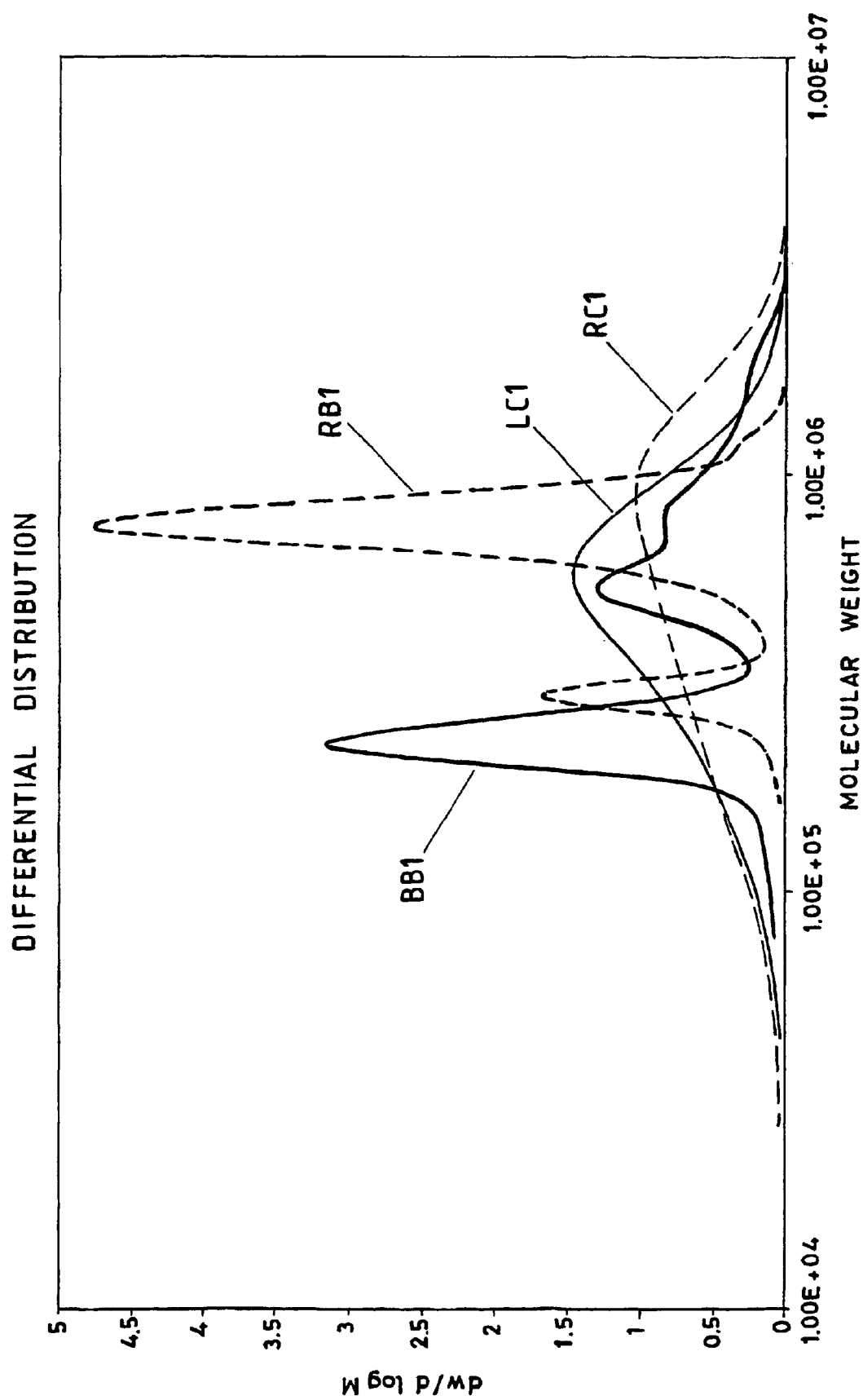

PROCESS FOR THE PREPARATION OF SBR RUBBERS WITH AN IMPROVED PROCESSABILITY AND A LOWER ROLLING RESISTANCE

The present invention relates to a process for the preparation of statistic elastomeric conjugated diene-vinyl arene copolymers, particularly SBR rubbers, with an improved processability and lower rolling resistance.

The processability of an elastomeric material is a term which normally indicates a complex behaviour which describes both the incorporation phase of the fillers, usually carbon black, silica or mixtures of both, in which the visco-elastic characteristics of the material play a fundamental role, and also the forming phase which requires a plasticity of the material sufficient to produce objects also having a complex form.

Scientific literature specifies the importance of a balanced ratio between the elastic and viscous properties of the rubber to provide, in short times, an elastomer mixed with the appropriate filler, maintaining, as already mentioned, adaptability to the moulds.

In this respect, it is considered particularly important to reduce the mixing times, in order to lower the preparation costs, by means of a better plant exploitation, without jeopardizing the dispersion degree of the filler.

One of the most important effects which can be observed during the dispersion phase of the filler is the progressive decrease in the viscosity of the blend, normally expressed as the difference between the Mooney viscosity of the blend and the Mooney viscosity of the rubber before incorporation of the filler (Delta Mooney). A non-optimum dispersion of the filler causes a higher value of this index, which is important in that the viscosity of the blend influences the subsequent processing to which the material is subjected.

Another and equally important effect of the optimum dispersion of the filler lies in minimizing the phenomena which cause a high hysteresis of the material, with particular reference to the interactions between the non-dispersed filler particles which, in mutual contact, cause an increase in the dissipation mechanisms.

The geometry of the molecule, the molecular weight, the dispersion index of the molecular weight distribution and possibly the presence of functional groups on the macromolecule are the main characteristics which determine the dispersion phase. Linear molecules have a more highly viscous component than radial molecules and these, in turn, have a more highly viscous component than branched molecules; with an increase in the dispersion index value of the elastomer, the importance of the elastic component also increases.

The elastic component of the material is important in the work transfer phenomenon from the machine to the elastomer+filler blend: this elastic component however should not be excessive as, due to the deformation to which the material is subjected, breakage rather than flow (plastic deformation) phenomena can arise with a consequent decrease in the work transfer efficiency from the machine to the blend.

The effect of the presence of branchings however (and their distribution) along the polymeric chain, particularly in the case of elastomers, is not completely clear.

The copolymerization of styrene and butadiene to give random styrene-butadiene copolymers in the presence of randomizing agents is known in the art: the copolymers can be prepared in batch- or continuous-type reactors, with macro or micro-structural differences, depending on the type of reactor selected. A batch-type reactor will produce, with complete conversion, a copolymer whose molecular weight distribution is generally lower than 1.5 (even if the polymer has been coupled) and a non-homogeneous styrene and vinyl frequency distribution along the molecular axis, depending however on the thermal difference of the reaction environment.

A reactor operating in continuous, on the other hand, produces a copolymer whose molecular weight distribution is approximately equal to or higher than 2, depending on the number of reactors used and the possible presence of kinetic chain transfer agents such as for example 1,2-butadiene, whereas the styrene and vinyl frequency distribution along the molecular axis is constant as the temperature of the reaction environment is constant.

For both types of reactor, the macrostructure of the live polymer at the end of the reaction (batch) or at the exit of the last reactor (continuous) is linear. The result is a poor processability of the polymer thus obtained. An improvement in the processability of the product is obtained by means of the use of coupling agents. The use of these coupling agents, in fact, in a quantity lower than or equal to the stoichiometric value causes the formation of a macrostructure of the radial type in which the number of branches is established by the functionality of the coupling agent. In the case of a batch polymerization, the branches are the same, whereas in the case of a copolymer synthesized in a continuous reactor, the branches are different. In both cases however the number of knots of each molecule is equal to one. Among the various coupling reagents known in the prior art, typical examples are halides of elements of group IV of the periodic system, for example $SiCl_4$ and $SnCl_4$. These compounds are used solely as coupling agents, as reaction with the reactive chain-end of the polymer causes its deactivation. The partialization of the coupling agent, or addition with non-complete conversion to cause the coupling reaction on a fraction of all the growing chains, although feasible, does not provide any improvement. In fact, it not only reduces the total concentration of the reactive chain-ends (thus slowing down the reaction kinetics) but also tends to produce branched structures in correspondence with the low molecular weight fractions of the polymer. The type of branchings produced is exclusively radial and, in the case of a continuous process, greatly depends on the concentration and distribution of the reactive chain-ends: inevitable heterogeneity in the distribution of the branchings influences the rheological characteristics of the resulting polymer.

In the case of the synthesis of macromolecules with more complex structures, i.e. with a number of knots per molecule which is higher than one, a termonomer can be used with a functionalization degree equal to or higher than two, to be used during the propagation phase of the kinetic chain. A typical example is divinylbenzene. The use of a termonomer during the polymerization phase introduces vinylaromatic groups into the polymer chain, which can still react with polymers in the propagation phase, causing the formation of branched structures.

The use of a termonomer however has various drawbacks. First of all, it must be used, in the case of a batch reactor system, in the propagation phase. Addition, in fact, at the beginning of the polymerization causes the formation of a polyfunctional initiator which is difficult to handle; addition at the end of the polymerization only allows the termonomer to be used as a polyfunctional coupling agent.

In both cases, the addition of a di- or poly-functional termonomer does not allow the production of a branched structure, but rather a radial structure with a low connectivity.

A process has now been found, which overcomes the above disadvantages as it allows branchings to be introduced into the polymeric chain, with the production of SBR rubbers having an excellent processability.

In accordance with this, the present invention relates to a process for the production of statistic elastomeric conjugated diene-vinyl arene copolymers having a branched structure which comprises:
(1) anionic copolymerization in solution of the conjugated diene and vinyl arene monomers, preferably butadiene and styrene, in the presence of randomizing agents and an initiator selected from the group of Lithium alkyls, the copolymerization being carried out until the almost total disappearance of the monomers;
(2) addition to the solution of step (1) of a quantity of Lithium alkyl from 1 to 4 times, preferably from 2 to 3 times, the molar quantity of the Lithium alkyl of step (1);
(3) addition to the polymeric solution of step (2) of a compound having the general formula R—Br, the molar ratio between R—Br and the total Lithium alkyl ranging from 0.6/1 to 1/1, preferably from 0.7/1 to 0.9/1, thus obtaining an elastomeric branched copolymer.

At the end of step (1) a quantity of coupling agent, for example $SiCl_4$, $SnCl_4$, can be optionally added.

The process of the present invention can be carried out batchwise or in continuous.

In a batch synthesis process, the mixture of diene and vinylaromatic monomers, in a hydrocarbon solvent, is charged into an adiabatic reactor together with suitable randomizing agents-vinylpromoters. The polymerization reaction is then activated using, as initiator, a compound of the group of lithium alkyls. When the conversion of the monomers is complete, a further aliquot of lithium alkyl corresponding, in moles, to 1 to 4 times the organic lithium used as initiator, is charged into the polymerization reactor. At the end of this phase, a quantity, in moles, of alkyl bromide R—Br in a ratio of 0.6/1 to 1/1 with the total quantity of organic lithium present in the polymeric solution, is charged into the polymerization reactor. The solution is kept under stirring for 30', is then discharged and subjected to normal removal procedures of the solvent and finishing.

In a continuous synthesis process, the mixture of diene and vinylaromatic monomers, in a hydrocarbon solvent, together with suitable randomizing agents-vinylpromoters and a possible anti-fouling agent, is fed to the first of a series of n reactors (with $n \geq 2$) of the CSTR type, together with the appropriate quantity of lithium alkyl as initiator. The conditions of the train of reactors (i.e. temperatures, residence times) is optimized so as to guarantee the required vinyl content in the end-polymer, together with complete conversion, at the outlet of the n–1th reactor. A stream of lithium alkyl corresponding, in moles, to 1 to 4 times the organic lithium used as initiator, is continuously fed in correspondence with this point. The mixing of this stream with the polymeric solution must be suitably effected to obtain complete homogeneity. A stream of alkyl bromide R—Br is then fed in a molar ratio ranging from 0.6/1 to 1/1 with respect to the total quantity of organic lithium present in the polymeric solution. Also in this case, the mixing with the polymeric solution must be appropriately effected to obtain complete homogeneity. The polymeric solution thus obtained is fed to the n-th reactor, with average residence times in the order of 30'. At the outlet of the train of reactors, the polymeric solution is discharged and subjected to the normal solvent-removal and finishing procedures.

The solvent which can be used in the process of the present invention can be an aromatic or naphthene hydrocarbon, for example toluene or cyclohexane, optionally modified by the presence of alkanes and alkenes, for example pentanes or pentenes.

The conjugated diene monomers which can be used in the present invention are 1,3 dienes containing from 4 to 12 carbon atoms, preferably from 4 to 8 carbon atoms. Examples of these dienes are 1,3-butadiene, isoprene, 2,3-dimethyl-1,3-butadiene, 1,3-pentadiene (piperylene), 2-methyl-3-ethyl-1,3-butadiene, 1,3-octadiene. In the preferred embodiment, the conjugated diene monomers are selected from 1,3-butadiene and isoprene, preferably 1,3-butadiene.

Typical examples of vinyl arenes are styrene, 1-vinyl naphthalene, 2-vinyl naphthalene and the related alkyl derivatives. In the preferred embodiment, the vinyl arene is styrene.

In the preferred embodiment, the process of the present invention enables the production of SBR rubbers (styrene butadiene rubber) having branching points (or "knots") statistically distributed along the axis of the macromolecule. The presence of these knots is extremely important from a Theological point of view as it allows a better processability. The term SBR rubbers refers to statistic copolymers in which the styrene units and different butadienyl units (1,4-cis, 1,4-trans and 1,2) are distributed at random along the polymeric chain.

As far as the Lithium alkyls are concerned, these are well known as anionic polymerization initiators of 1,3-dienes. They are compounds having the general formula $R(Li)_x$ wherein R represents a hydrocarbyl group containing from 1 to 20, preferably from 2 to 8, carbon atoms, and x is an integer ranging from 1 to 4. The above hydrocarbyl groups can be primary, secondary or tertiary, even though primary and secondary groups are preferred. Examples of these alkyl groups are methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl and octadecyl. Specific examples of Lithium alkyls which can be used in the process of the present invention are lithium n-butyl, lithium n-propyl, lithium isobutyl, lithium t-butyl, lithium amyl. Mixtures of lithium alkyls can also be used. The preferred lithium alkyl is lithium n-butyl.

With respect to the randomizing agents, these are compounds well known to experts in the field, suitable for preventing polydiene and/or polyvinylarene blocks (see for example U.S. Pat. No. 5,231,153 and U.S. Pat. No. 4,647, 635).

In the compound having the general formula R—Br, R is a monofunctional $C_1$–$C_{30}$ hydrocarbyl radical selected from alkyl, cycloalkyl and aryl radicals. Typical examples of compounds having the general formula RBr are monobromomethane, monobromoethane and the relative higher homologous products, monobromocyclohexane, monobromobenzene and its alkyl derivatives. In the preferred embodiment R is a monofunctional $C_3$–$C_{10}$, even more preferably $C_8$, alkyl radical.

The process of the present invention, including all the steps, is generally carried out at a temperature ranging from 40° C. to 140° C., preferably from 60° C. to 120° C., under such conditions however as to keep the monomers in liquid phase.

The mechanism at the basis of the formation of the particular macrostructure described above probably derives from a reaction of the radicalic type, in which primary radicals are formed by homolysis of the C—Br bond induced by the organic lithium present in the solution (see Gian Tommaso Viola and Claudio Cavallo, Journal of Polymer Science: Part A: Polymer Chemistry, Vol. 35, 17–25 (1997)).

This reaction only involves an aliquot of the C—Br bonds available in an equivalent quantity, or lower, with respect to the total quantity of lithium present in solution in an active form, the other aliquot participating in an ionic-type mechanism with direct alkylation.

The process of the present invention allows the macrostructure of the resulting polymer to be optimized, thus maximizing the length of the branches which diverge from the knots.

The polymers of the present invention, having a good processability, are prevalently used as bases for mixtures, optionally mixed with other elastomers, together with inorganic fillers (carbon black, silica or mixtures of these), oil-extenders, vulcanizing agents, for the preparation of tyre treads.

In particular tyre treads which can be obtained starting from the elastomers thus prepared show a reduced rolling resistance.

The following examples are provided for a better understanding of the present invention.

EXAMPLES

Examples are described for the preparation of materials having the same composition and microstructure (styrene content always 25% by weight, and content of vinyl units always within the range of 65–67%) but different macrostructures with the same Mooney viscosity of the oil-extended rubber (oil content for all the samples 27.3% by weight). It is known in fact that the Mooney viscosity is very important in the manufacturing of tyres, as an indicator of the processability of a material.

Table 1A indicates the main characteristics of the polymers prepared, i.e. Mw, Mw/Mn, the branching degree, styrene %, % of vinyl units, gel %, alpha, Mooney viscosity, oil content and type of analysis used.

Characterization of the Materials Synthesized

GPC-MALLS. With this technique it is possible to efficiently separate components with a different molecular weight by means of chromatography by exclusion, by measuring, for each fraction, the absolute molecular weight, obtained by means of a diffused light detector on various angles on the part of the single macromolecules in solution.

It is therefore possible to describe a macromolecule in terms of dependence of the radius of gyration with the molecular weight, said dependence being linear.

As a macromolecule with internal knots (radial structures and branched structures) has, with the same molecular weight, a lower hydrodynamic volume with respect to a linear molecule, the slope of the above line ($\alpha$ coefficient) will be greater or lesser, depending on the lesser or greater interconnection degree of the structure.

In particular, for linear macromolecules, the proportionality coefficient between radius of gyration and molecular weight is equal to 0.58, whereas for branched molecules this value is progressively lower. For example SBR-E (statistic styrene/butadiene copolymer prepared by means of radicalic polymerization in emulsion) has an $\alpha$ value equal to 0.35–0.38.

Equipment data:
HP 1090 chromatograph
Solvent: THF
Temperature: 25° C.,
PL-Gel columns $10^5$-$10^5$-$10^4$-$10^3$,
RI HP 1047 A detector,
MALLS Wyatt Technology mod. DAWN-DSP,
dn/dc 0.137 mi/g.
KMX16-CROMATIX differential refractometer.
FIG. 1 indicates the molecular weight distribution of some of the polymers prepared.

Comparative Example 1

Linear Batch LB1

The following products are charged in this order into a 20 liter stirred reactor: 15 liters (11.7 Kg) of cyclohexane, 2.4 grams (200 ppm) of tetrahydrofurfuryl ethyl ether (THFA), 1.14 Kg of butadiene and 0.38 Kg of styrene. The reagent mixture is brought to a temperature of 30° C., Li n-butyl (2.05 grams of a solution at 5% by weight) is added and the mixture is left to react for 20 minutes. At the end of the reaction, the temperature is 80° C. and the reaction is terminated by adding 0.15 grams of ethyl alcohol. After cooling, the polymeric solution is extracted from the reactor and 0.560 Kg of highly aromatic oil and an antioxidant system (phenolic+phosphite) are added.

The solution containing the polymer, the aromatic oil and antioxidants is fed to a stirred reactor containing water heated by the introduction of vapour at 100° C., to eliminate the solvent. Once the solvent has been removed, the clots of damp rubber are recovered by filtration on metal netting, mechanically squeezed and dried in a vacuum oven maintained at 60° C. for 24 hours. Under these conditions, the residual water content is normally less than 0.3% by weight.

Comparative Example 2

Linear Continuous LC1

The experiment is carried out on a train of reactors consisting of two CSTR-type reactors in series having a volume equal to 100 liters each, for the copolymerization of the product and a mixer on line for the feeding of the shortstopper and antioxidant system. The residence time in the mixer is about half that of a single reactor.

Both reactors are equipped with a wall-cleaning system, a wall-scraper, connected to the stirrer shaft. The stirring system is standard with three radial propellers along the shaft.

The feeding of the reaction ingredients is effected by means of pumps whose flow-rate is regulated by massive-type meters. The mixture of reagents (cyclohexane, styrene, butadiene, vinylpromoter agent and anti-fouling agent) is prepared in a stirred reactor and under a pressure of nitrogen in a quantity which is sufficient to guarantee continual running, the composition of the reagents being kept constant for the necessary period of time.

The initiator (NBL) is fed directly to the inlet of the first reactor.

The polymerization reactors operate completely full, by feeding the ingredients from the bottom; the variation in the residence times is effected by varying the feeding flow-rates.

The reaction temperature control is carried out by regulating the temperature of the solvent and monomers at the inlet of the first reactor using exchangers, whereas the operating pressure is set and maintained at 3 bars.

A polymerization was carried out under the above conditions with residence times in the two CSTR reactors of 30 minutes, feeding the reagent mixture containing 9% by weight of butadiene and 3% by weight of styrene together with 250 ppm of randomizing agent/vinyl promoter so that the ratio between lithium and randomizing agent remained within the range of 0.3–0.25. Under the above conditions, at a temperature of 57° C. in the first reactor, a conversion equal to 74% and a temperature of 66° C. in the second reactor, with an overall conversion of 99%, a polymer was obtained, which, after stoppage with ethanol and the addition of an antioxidant in the mixer on line, was collected in a blend and extended with highly aromatic oil in a quantity of 27%. The polymer was then separated from the solvent by stripping in a vapour stream and subsequently mechanically dried by means of extrusion.

GPC analysis of the polymer gave a weight average molecular weight equal to 540,000, a dispersion of 1.9, a vinyl unit content equal to 67% and a Mooney viscosity equal to 51.

Comparative Example 3

Radial Batch RB1

The following products are charged into the reactor described in example 1: 15 liters (11.7 Kg) of cyclohexane, 4.9 grams (400 ppm) of THFA, 1.14 Kg of butadiene and 0.38 Kg of styrene. The reagent mixture is brought to a temperature of 30° C., Li n-butyl (3 grams of a solution at 5% by weight) is added and the mixture is left to react for 20 minutes. At the end of the reaction, the temperature is 80° C. 1.59 grams of a solution at 5% in cyclohexane of $SiCl_4$ are added to the reaction environment. After cooling, the polymer solution is extracted from the reactor and 0.560 Kg of highly aromatic oil are added together with an antioxidant system (phenolic+phosphite).

The solution containing the polymer, the aromatic oil and antioxidants is fed to a stirred reactor containing water heated by the introduction of vapour at 100° C. to eliminate the solvent. Once the solvent has been removed, the clots of damp rubber are recovered by filtration on metal netting, mechanically squeezed and dried in a vacuum oven maintained at 60° C. for 24 hours. Under these conditions, the residual water content is normally less than 0.3% by weight.

GPC analysis of the material gave an Mw value equal to 649,000, an MW dispersion of 1.33, a percentage of 1,2 equal to 65% and a Mooney viscosity of 49.

Comparative Example 4

Radial Continuous RC1

A polymerization is carried out using a reactor system analogous to that of example 2, but inserting a third 50 liter CSTR reactor (to complete the reaction) and subsequently a mixer on line (used for adding the coupling agent), with residence times in the first two CSTR reactors of 30 minutes, feeding the reagent mixture containing 9% by weight of butadiene and 3% by weight of styrene together with 350 ppm of randomizing agent/vinyl promoter so that the ratio between lithium and randomizing agent remained within the range of 0.5–0.6. Under the above conditions, there is a temperature of 53° C. in the first reactor with a conversion equal to 59%, a temperature of 61° C. in the second reactor, with an overall conversion of 90%, a temperature of 66° C. in the third reactor with a final conversion of 98%. A polymer is obtained, which, after the addition of $SiCl_4$ in a quantity equal to 40% of the lithium fed (equivalents/equivalents) and an antioxidant, was collected in a blend and extended with highly aromatic oil in a quantity of 27%. The polymer was then separated from the solvent by stripping in a vapour stream and subsequently mechanically dried by means of extrusion.

GPC analysis of the polymer gave a weight average molecular weight equal to 720,000, a dispersion of 2.6, a vinyl unit content equal to 66% and a Mooney viscosity equal to 50.

Example 5

Branched Batch BB1

The following products are charged into the same batch reactor used in example 1: 15 liters (11.7 Kg) of cyclohexane, 4.5 grams (380 ppm) of THFA, 1.14 Kg of butadiene and 0.38 Kg of styrene. The reagent mixture is brought to a temperature of 30° C., Li n-butyl (4.1 grams of a solution at 5% by weight) is added and the mixture is left to react for 20 minutes. At the end of the reaction, the temperature is 80° C. 12.3 grams of NBL (solution at 5% by weight) and 2.05 grams of Bromine octyl are then added to the reaction environment. After cooling, the polymer solution is extracted from the reactor and 0.560 Kg of highly aromatic oil are added together with an antioxidant system (phenolic+phosphite).

The solution containing the polymer, the aromatic oil and antioxidants is fed to a stirred reactor containing water heated by the introduction of vapour at 100° C. to eliminate the solvent. Once the solvent has been removed, the clots of damp rubber are recovered by filtration on metal netting, mechanically squeezed and dried in a vacuum oven maintained at 60° C. for 24 hours. Under these conditions, the residual water content is normally less than 0.3% by weight.

GPC analysis of the material gave an Mw value equal to 475,000, an Mw dispersion of 1.5, a percentage of 1,2 equal to 64% and a Mooney viscosity of 49.

Example 6

Branched Continuous BC1

A polymerization is carried out using a reactor system analogous to that of example 2, but inserting a second mixer on line, the first used for the addition of Li n-butyl and the second for the addition of Br-alkyl, with residence times in the first two CSTR reactors of 30 minutes, feeding the reagent mixture containing 9% by weight of butadiene and 3% by weight of styrene together with 350 ppm of randomizing agent/vinyl promoter so that the ratio between lithium and randomizing agent remains within the molar range of 0.45–0.69. Under the above conditions, there is a temperature of 56° C. in the first reactor with a conversion equal to 62%, a temperature of 64° C. in the second reactor, with an overall conversion of 95%, a temperature of 67° C. in the third reactor with a final conversion of 99.9%. When the conversion is complete, 0.06 phr of lithium n-butyl are added to the first mixer on line and the same number of equivalents of Br-octyl to the second mixer on line. A polymer is obtained which, after the addition of an antioxidant, is collected in a blend and therein extended with highly aromatic oil in a quantity of 27%. The polymer is then separated from the solvent by stripping in a vapour stream and subsequently mechanically dried by means of extrusion.

GPC analysis of the polymer gave a weight average molecular weight equal to 660,000, a dispersion of 2.4, a vinyl unit content equal to 67% and a Mooney viscosity equal to 51.

Example 7

Branched Continuous BC2

A polymerization is carried out using a reactor system analogous to that described in example 6, but inserting a second mixer on line, the first used for the addition of Li n-butyl and the second for the addition of Br-alkyl, with residence times in the first two CSTR reactors of 30 minutes, feeding the reagent mixture containing 9% by weight of butadiene and 3% by weight of styrene together with 350 ppm of randomizing agent/vinyl promoter so that the ratio between lithium and randomizing agent remains within the range of 1.8–2.3. Under these conditions, there is a temperature of 57° C. in the first reactor with a conversion equal to 64%, a temperature of 66° C. in the second reactor, with an overall conversion of 98%, a temperature of 67° C. in the third reactor with a final conversion of 99.9%. When the conversion is complete, 0.08 phr of lithium n-butyl are added to the first mixer on line and the same number of equivalents of Br-octyl to the second mixer on line. A polymer is obtained which, after the addition of an antioxidant, is collected in a blend and therein extended with highly aromatic oil in a quantity of 27%. The polymer is then separated from the solvent by stripping in a vapour stream and subsequently mechanically dried by means of extrusion.

GPC analysis of the polymer gave a weight average molecular weight equal to 680,000, a dispersion of 2.5, a vinyl unit content equal to 66% and a Mooney viscosity equal to 50.

Example 8

Branched Continuous BC3

A polymerization is carried out using a reactor system analogous to that described in example 7, with residence times in the first two CSTR reactors of 30' each, feeding the reagent mixture containing 9% by weight of butadiene and 3% by weight of styrene together with 350 ppm of randomizing agent/vinyl promoter so that the ratio between lithium and randomizing agent remains within the range of 1.8–2.3. Under these conditions, there is a temperature of 57° C. in the first reactor with a conversion equal to 64%, a temperature of 66° C. in the second reactor, with an overall conversion of 98%, a temperature of 67° C. in the third reactor with a final conversion of 99.9%. When the conversion is complete, 0.1 phr of lithium n-butyl are added to the first mixer on line and the same number of equivalents of Br-octyl to the second mixer on line, obtaining a polymer which, after the addition of an antioxidant, is collected in a blend and therein extended with highly aromatic oil in a quantity of 27.3%. The polymer is then separated from the solvent by stripping in a vapour stream and subsequently mechanically dried by means of extrusion.

GPC analysis of the polymer gave a weight average molecular weight equal to 700,000, a dispersion of 2.6, a vinyl unit content equal to 65% and a Mooney viscosity equal to 51.

Comparative Example 9

Branched Continuous BC4 with DVB

A polymerization is carried out using a reactor system analogous to that described in example 7, with residence times in the first two CSTR reactors of 30' each, feeding the reagent mixture containing 9% by weight of butadiene and 3% by weight of styrene together with 350 ppm of randomizing agent/vinyl promoter, so that the ratio between lithium and randomizing agent remains within the range of 1.8–2.3. A quantity of solution is fed from a container containing a solution in cyclohexane of DVB, to the first and second reactor so that the ratio between the DVB fed to the first reactor and that fed to the second reactor ranges from 1.4–1.5 and the molar ratio between Li and DVB fed to the first reactor ranges from 6.0 to 3.0 (when Li/DVB in the first reactor is considered as being equal to 3.0 and $DVB_1/DVB_2=1.5$, the total Li/DVB ratio will be 2:1). Under the above conditions, there is a temperature of 55–57° C. in the first reactor with a conversion equal to 62–64%, a temperature of 64–66° C. in the second reactor, with an overall conversion of 98%, a temperature of 67° C. in the third reactor with a final conversion of 99.9%. A polymer is obtained which, after the addition of an antioxidant, is collected in a blend and therein extended with highly aromatic oil in a quantity of 27.3%. The polymer is then separated from the solvent by stripping in a vapour stream and subsequently mechanically dried by means of extrusion.

GPC analysis of the polymer gave a weight average molecular weight equal to 650,000, a dispersion of 2.3, a vinyl unit content equal to 66% and a Mooney viscosity equal to 51.

There is absence of gel.

Comparative Example 10

BC5

Using the same operating conditions described in the previous example, the quantity of DVB is fed in the same proportions to the two reactors, but in a greater quantity with respect to the Li. In particular, a total quantity is fed, in moles, equal to the Lithium fed.

Analysis of the soluble part provides a molecular weight equal to 670,000 and a gel content equal to 5%.

Comparative Example 11

BC6

Using the same operating conditions described in example 9, a quantity of DVB is fed which as a whole is equal to the lithium, but with different relative quantities: 75% to the first reactor and 25% to the second reactor. The quantity of insoluble product is equal to 22%., whereas the molecular weight of the soluble part is equal to 670,000.

TABLE 1A

| Sample | Mw | Mw/Mn | Branch. degree (%) | Sty. % | 1.2 % | Gel % | Alpha | Mooney | Oil % | |
|---|---|---|---|---|---|---|---|---|---|---|
| LB1 comp. | 950,000 | 1.3 | 0 | 25 | 66 | absent | — | 50 | 27.3 | GPC |
| LC1 comp. | 540,000 | 1.9 | — | 25 | 67 | absent | 0.58 | 51 | 27.3 | GPC |
| RB1 comp. | 649,000 | 1.33 | 81 | 25 | 65 | absent | — | 49 | 27.3 | Malls |
| RC1 comp. | 720,000 | 2.6 | — | 25 | 66 | absent | 0.51 | 50 | 27.3 | |
| BB1 | 475,000 | 1.5 | 50 | 25 | 64 | absent | 0.48 | 50 | 27.3 | |
| BC1 | 660,000 | 2.4 | — | 25 | 67 | absent | 0.48 | 51 | 27.3 | Malls |
| BC2 | 680,000 | 2.5 | — | 25 | 66 | absent | 0.46 | 50 | 27.3 | |
| BC3 | 700,000 | 26 | — | 25 | 65 | absent | 0.44 | 51 | 27.3 | |
| BC4 comp. | 650,000 | 2.3 | — | 25 | 66 | absent | 0.51 | 51 | 27.3 | |
| BC5 comp. | 670,000 | 2.4 | — | 25 | 67 | 5% | 0.50 | 54 | 27.3 | |
| BC6 comp. | 670,000 | 2.3 | — | 25 | 66 | 22% | 0.49 | 65 | 27.3 | |

Comment on Table 1A and FIG. 1

The use of the bromine branching system according to the present invention causes the formation of branched structures by means of reactions probably of the radicalic type. These reactions are carried out with complete conversion: this reduces the tendency of causing fouling inside the polymerization reactors and of the formation of gels. The branched structure can also be formed during polymerization by feeding DVB: in this case the danger of gel is high and the max branching degree which can be reached is lower.

The particular structure obtained using the method illustrated in the present patent is characterized by the creation of branching points, or "knots", statistically distributed along the axis of the macromolecule. These "knots", as already described above, are generated by the coupling of two macro-radicals, which are formed, in turn, by the extraction of an allyl proton. The origin and nature of the branched points are demonstrated by MALLS analysis comparing a batch S—SBR with a radial structure obtained by reaction with $SiCl_4$ (RB1), a batch branched S—SBR by reaction between lithium alkyl and an alkyl bromide described in the text (BB1) and two S—SBR in continuous, one linear (LC1) and the other radial to $SiCl_4$ (RC1). These three samples have approximately the same Mooney viscosity (50 points) following the addition of 37.5 phr (corresponding to 27.3%) of aromatic oil.

Although the polymer precursor has, for the branched bromine polymer (BB1), a lower molecular weight than the corresponding S—SBR radial to $SiCl_4$, the presence of high molecular weight fringes is observed in the former, but not in the latter. Knowing the ionic reaction which causes the formation of a stellar structure with a number of arms $\geq 3$, on comparing the two MALLS curves indicated with RB1 and BB1, the presence of the coupling radicalic mechanism which leads to the formation of fractions with a branching degree greater than or equal to 3, is confirmed.

It is also interesting to note (see FIG. 1) that, on comparing the distributions of the two S-SBR in continuous with that of the branched bromine polymer of the present invention, in all cases there is a molecular weight greater than $10^6$ g/mol.

This is an important factor, taking in account the differences which naturally arise between an anionic batch synthesis process and a continuous process (i.e. the presence of high molecular weight fringes in the latter).

With respect to the use of di- or poly-functional monomers (i.e. DVB) for the introduction of branchings in a continuous synthesis process, it is worth pointing out that in this case the "knots" tend to be concentrated on the high molecular weight fractions, owing to the reactivity of the monomer itself, whereas, due to the statistic nature of the reaction between the radicals, the use of the lithium alkyl-alkyl bromide system tends to give branchings distributed along the molecular weight axis.

Evaluation of Raw and Vulcanized Polymers

Table 1B indicates the properties of the raw blends of the elastomers listed in Table 1A, whereas Table 1C specifies the properties of the relative vulcanized rubbers.

The methods and instruments used for the characterizations of Tables 1B and 1C are as follows:

Mooney viscosity: Monsanto MV2000E Viscometer, ASTM D1646;

Extrusion (Garvey index, swelling, shrinkage): Royle Drawplate 80 rpm −90° C., ASTM D2230;

Rheometric characteristics: Monsanto 2000 O.D.R., ASTM D2084;

Tensile properties (ultimate tensile strength, ultimate elongation, moduli): Instron 1121, ASTM D 412;

Tear: Instron 1121, ASTM D624, B;

Hardness: Zwick Durometer, ASTM D 2240;

Elastic yield: Zwick Pendulum, DIN 53512;

Abrasion: DIN 53516;

Dynamic tests (tan δ): Rheometrics RDS II, internal method.

The basic formulation of the blend used for all the polymers is centered on the use of a functionalized silica (Coupsil 8113 $GR^R$).

The quantities used are:

oil-extended polymer of Tab. 1A: 137.5 phr;

Coupsil 8113 $GR^R$: 87.5 phr;

Santoflex$^R$ 13: 1 phr;

Anox HB: 1 phr;

Zinc oxide: 2.5 phr;

Stearic acid: 1 phr;

Riowax$^R$ 721: 1,5 phr;

DPG (DiPhenylGuanidine): 2 phr;

CBS (N-Cyclohexyl 2 Benzothiazyl Sulfene-amide): 1.7 phr;

Sulfur: 1.4 phr;

Polyplastol$^R$ 19: 3 phr.

Preparation Conditions of the Blends

The preparation of the blend was effected under the following conditions:

Braebender with a 350 cc chamber and Banbury-type rotors;
Starting temperature: 60° C.;
Cycle=6 minutes;
Discharge temperature: 150° C.
The acceleration of the mixture is effected in an open mixer for 6 minutes.

Vulcanization of the Blend

The vulcanization process was effected by moulding test samples for 40 minutes at 151° C.

TABLE 1B

| Sample | Tack-iness | Mooney compound | Δ Mooney | Garvey index | Swelling % | Shrinkage % |
|---|---|---|---|---|---|---|
| LB1 | 8/10 | 126 | 86 | 3 | —(°) | —(°) |
| LC1 | 5/10 | 110 | 59 | 4 | 34 | 28 |
| RB1 | 8/10 | 124 | 75 | 4 | 26 | 20 |
| RC1 | 4/10 | 110 | 60 | 4 | 37 | 32 |
| BB1 | 6/10 | 100 | 50 | 4 | 47 | 32 |
| BC1 | 5/10 | 95 | 45 | 7 | 49 | 33 |
| BC2 | 5/10 | 93 | 43 | 7 | 45 | 30 |
| BC3 | 6/10 | 92 | 41 | 5 | 42 | 29 |
| BC4 | 5/10 | 97 | 46 | 6 | 51 | 34 |
| BC5 | 6/10 | 99 | 45 | 5 | 46 | 30 |
| BC6 | 7/10 | 155 | 50 | 4 | 40 | 26 |

TABLE 1C

| Sample | Hardness | Mod. 100% | Mod. 200% | Mod. 300/ Mod. 100% | CR MPa | Ar % | Tear N/mm | Abrasion DIN mm3 | Elastic yield 0° C. | Elastic yield 70° C. | Tan delta |
|---|---|---|---|---|---|---|---|---|---|---|---|
| LB1 | (*) | (*) | (*) | (*) | (*) | (*) | (*) | (*) | (*) | (*) | (*) |
| LC1 | 72 | 2.6 | 5.6 | 3.8 | 18.1 | 460 | 51 | 150 | 5 | 35 | 0.195 |
| RB1 | 70 | 2.9 | 6.6 | 3.9 | 19 | 400 | 39 | 147 | 6 | 40 | 0.180 |
| RC1 | 71 | 2.8 | 6.1 | 3.9 | 20 | 450 | 45 | 150 | 6 | 34 | 0.196 |
| BB1 | 71 | 2.8 | 6.2 | 3.8 | 18.5 | 430 | 45 | 151 | 6 | 34 | 0.190 |
| BC1 | 71 | 2.8 | 5.9 | 3.8 | 19.1 | 480 | 45 | 153 | 6 | 34 | 0.195 |
| BC2 | 71 | 2.6 | 5.9 | 3.8 | 19.2 | 470 | 47 | 155 | 6 | 35 | 0.192 |
| BC3 | 71 | 2.6 | 6.0 | 3.8 | 20.1 | 460 | 49 | 153 | 6 | 34 | 0.190 |
| BC4 | 70 | 2.7 | 5.8 | 3.7 | 19.5 | 460 | 45 | 150 | 6 | 31 | 0.210 |
| BC5 | 71 | 2.6 | 5.8 | 3.9 | 19.0 | 450 | 42 | 151 | 6 | 33 | 0.206 |
| BC6 | 70 | 2.6 | 5.9 | 4 | 19 | 410 | 38 | 153 | 5 | 34 | 0.205 |

(*) not effected

Comment on Tables 1B and 1C

From an analysis of Tables 1B and 1C, it can be seen that the introduction of Long Chain Branching (LCB) causes, with respect to a linear continuous:
1. Greater elastic component of the gross rubber (Table 1B).
2. Lower Mooney Delta and therefore better dispersion of the filler (Table 1B).
3. Lower hysteresis of the material (lower tan delta, Table 1C).

In general, therefore, the introduction of an elastic component, obtained by branching, not only improves the dispersion of the fillers but also the dynamic characteristics of the material. The advantage of the present method with respect to the use of a termonomer (divinylbenzene) is that the elastic component can be increased by modifying the branching agent with greater margins of freedom with respect to the formation of gel.

As far as the technological-applicative properties are concerned, it can be observed that in polymers with a wide distribution (those obtained from a continuous process) the presence of low molecular weight fringes causes an increase in the tackiness (Table 1B). An increase in the branching content therefore improves the behaviour of the material during the preparation phase of the blend. Furthermore "long" branchings of the statistic type participate in reducing the Delta Mooney value, due to an improved (and more rapid) dispersion of the filler and other ingredients of the blend. The presence of gels, on the contrary, significantly increases the Mooney viscosity of the blend and consequently the Delta Mooney, as indicated for samples BC5 and BC6 (see table 1B).

The continuous "branched" products show an evident improvement as far as the evaluation of the extruded product in the Garvey test is concerned. Also in this case however, the presence of gels has a negative effect on the quality of the result. The swelling also increases with an increase in the branching content.

In the field of properties on the vulcanized product (Table 1C), the continuous branched products show a tendency of increasing the elastic modulus (tensile test), whereas the ultimate elongations correspondingly decrease. The presence of gels negatively influences the ultimate elongations (BC5 and BC6).

With respect to the tan delta (hysteresis of the material), the bromine branched products (from both batch processes and continuous processes) show better characteristics than the products BC4, BC5 and BC6 (divinylbenzene). On examining the results by subdividing the samples into homogeneous "groups" (i.e. wide distribution=relatively high chain-end concentration), it can be seen that the structure of the products BC1, BC2 and BC3 gives better results than those of the other continuous branched products.

What is claimed is:

1. A process for producing statistic elastomeric conjugated diene-vinyl arene copolymers having a branched structure which comprises:
   (1) anionic copolymerization in solution of the conjugated diene and vinyl arene monomers, in the presence of randomizing agents and an initiator selected from the group of lithium alkyls, the copolymerization being carried out until the total disappearance of the monomers;
   (2) addition to the solution of step (1) of a quantity of lithium alkyl from 1 to 4 times the molar quantity of the lithium alkyl of step (1);
   (3) addition to the polymeric solution of step (2) of a primary alkyl halide the having the general formula R—Br, the molar ratio between R—Br and the total lithium alkyl ranging from 0.6/1 to 1/1, wherein R is at least one monofunctional $C_1$–$C_{30}$ hydrocarbyl radical, thus obtaining elastomeric branched copolymer.

2. The process according to claim 1, characterized in that the conjugated diene monomer is selected from 1,3 dienes containing from 4 to 1 carbon atoms.

3. The process according to claim 2, characterized in that the conjugated diene monomer is butadiene.

4. The process according to claim 1, characterized in that the vinyl arene is styrene.

5. The process according to claim 1, characterized in that in step (2) a quantity of Lithium alkyl from 2 to 3 times the molar quantity of Lithium alkyl of step (1), is added to the solution of step (1).

6. The process according to claim 1, characterized in that in step (3) a compound having the general formula R—Br, is added to the polymeric solution of step (2), the molar ratio between R—Br and the total Lithium alkyl ranging from 0.7 1 to 0.9/1.

7. The process according to claim 1, wherein R is a $C_3$–$C_{10}$ monofunctional alkyl radical.

8. The process according to claim 7, wherein R is octyl.

9. The process according to claim 1, characterized in that a coupling agent is added after step (1) and before step (2).

10. A process for producing a random elastomeric conjugated diene-vinylene arene copolymer having a branched structure, said process comprising:
    anionically copolymerizing in solution a monomer mixture comprising at least one conjugated diene monomer and at least one vinyl arene monomer, in the presence of one or more randomizing agents and at least one lithium alkyl initiator, wherein the copolymerizing is carried out until complete, to form a first reaction mixture;

adding at least one lithium alkyl to the first reaction mixture in an amount of from 1 to 4 times the molar quantity of the lithium alkyl present during the anionic copolymerizing, to form a second reaction mixture;

adding at least one primary alkyl halide of formula R—Br to the second reaction mixture, wherein the molar ratio of R—Br to the total amount of lithium alkyl is from 0.6/1 to 1/1, to form an elastomeric branched copolymer, wherein R is at least one monofunctional $C_1$–$C_{30}$ hydrocarbyl radical.

11. The process according to claim 10, wherein the conjugated diene monomer is at least one 1,3-diene containing from 4 to 12 carbon atoms.

12. The process according to claim 11, wherein the conjugated diene monomer is butadiene.

13. The process according to claim 10, wherein the vinyl arene is styrene.

14. The process according to claim 10, wherein the amount of lithium alkyl added to the second reaction mixture is from 2 to 3 times the molar quantity of the lithium alkyl added to the first reaction mixture.

15. The process according to claim 10, wherein the compound having formula R—Br is added to the first reaction mixture and the molar ratio of R—Br and the total lithium alkyl is from 0.7/1 to 0.9/1.

16. The process according to claim 10, wherein R is a $C_3$–$C_{10}$ monofunctional alkyl radical.

17. The process according to claim 16, wherein R is octyl.

18. The process according to claim 10, further comprising adding a coupling agent after step (1) and before step (2).

* * * * *